United States Patent

Mertz

[15] 3,696,528
[45] Oct. 10, 1972

[54] QUESTION GAME INCLUDING MECHANICALLY INDEXED ANSWER APPARATUS

[72] Inventor: Henry A. Mertz, Fort Wayne, Ind. 47713

[22] Filed: Nov. 10, 1969

[21] Appl. No.: 875,125

[52] U.S. Cl.............35/9 R, 273/135 R, 273/141 R
[51] Int. Cl...................................................A63f 9/18
[58] Field of Search....273/135, 141 R; 35/35 F, 9 R; 235/70 R

[56] References Cited

UNITED STATES PATENTS 3,386,653  6/1968  Phipps.....................235/70 R
2,907,123  10/1959  McMahon..................35/35 F
2,676,019  4/1954  Steinberg................273/141 R

OTHER PUBLICATIONS

Meet the Presidents Selchow & Righter Co. Bayshore, N.Y. 100th Anniversary Game Catalog 3/14/68

The World's Educator Geyer's Sta. 10/31/67

Primary Examiner—Richard C. Pinkham
Assistant Examiner—Marvin Siskind
Attorney—Hood, Gust, Irish & Lundy

[57] ABSTRACT

An educational game having a plurality of pictorial representations thereon arranged in a predetermined order on a gameboard, and a series of identifications or descriptions of the representations arranged on the gameboard in an order different from the order of the pictorial representations. Associated with each of the identifications or descriptions is a multi-digit number. A telephone-dial-like device is provided. The game is played by picking one of the identifications or descriptions, guessing which representation relates to it, dialing the multi-digit number associated with the identification or representation picked, the completion of which will indicate which pictorial representation is associated with that identification or description. A point is scored if the correct pictorial representation was guessed.

5 Claims, 3 Drawing Figures

PATENTED OCT 10 1972 3,696,528
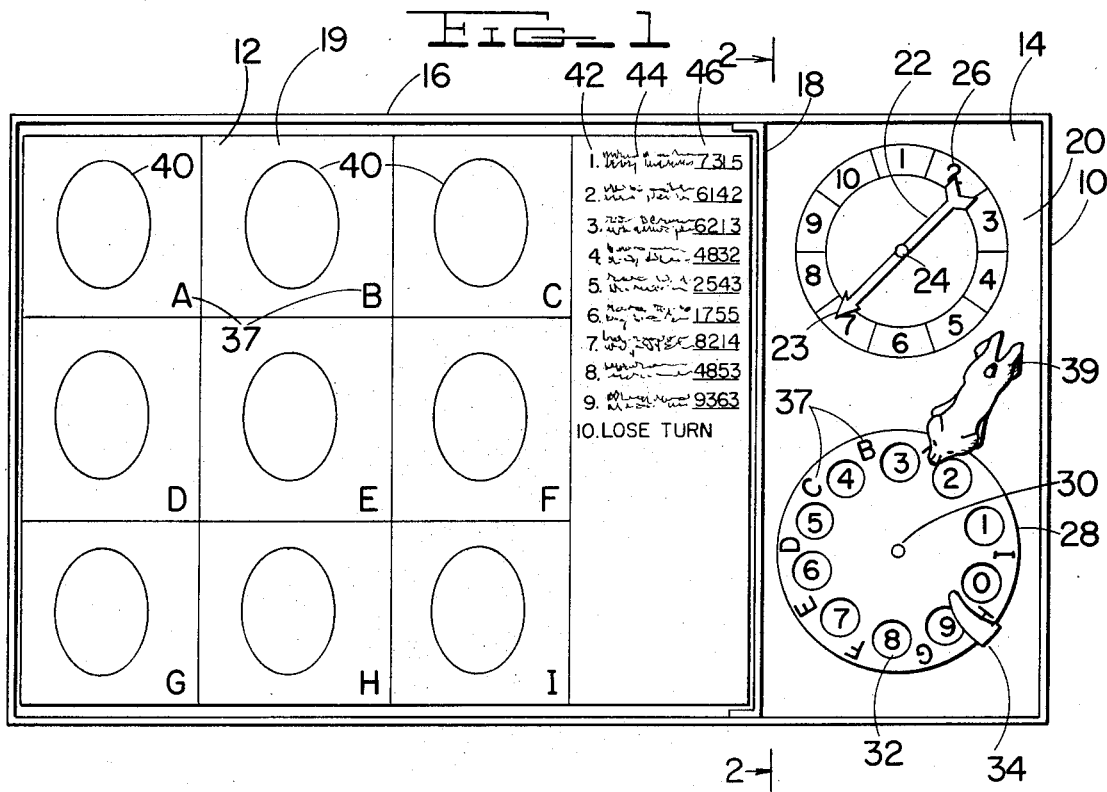
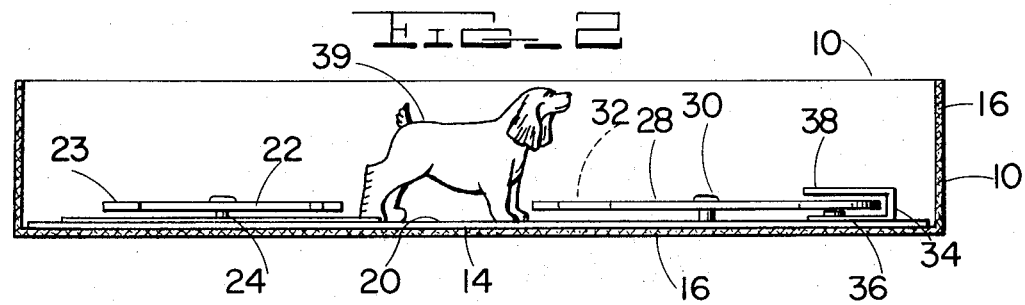
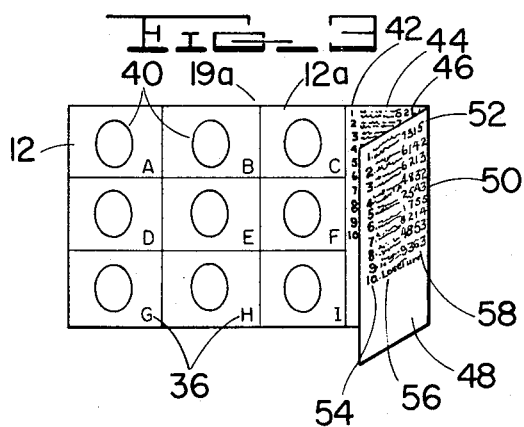
INVENTOR
HENRY A. MERTZ
BY Wood, Dalton, Irish & Lundy
ATTORNEYS

QUESTION GAME INCLUDING MECHANICALLY INDEXED ANSWER APPARATUS

BACKGROUND OF THE INVENTION

1. Field of the Invention

The invention relates to a game, and more specifically, to an educational game which may be played by both children and adults and which employs mechanical devices as components thereof.

2. Description of the Prior Art

Educational games have heretofore been proposed. Some of these employ mechanical devices as components thereof. However, it has always been desirable to provide an improved educational game which is fun to play and educational for both children and adults.

SUMMARY OF THE INVENTION

It is an object of this invention to provide an improved educational game having manually operable devices which serve in combination with printed material to identify or name one of a plurality of representations.

It is a further object of this invention to provide an improved game having two mechanical devices which are interrelated and perform identification functions.

It is still further an object of this invention to provide an improved game having two manually operable devices which are interrelated to perform identification functions and which serve in combination with printed material to identify or name a plurality of pictorial representations.

In the broader aspects of this invention there is provided a game comprising a gameboard having a series of representations and a list of identifications or descriptions thereof arranged in random order thereon. Each identification has a multi-digit number associated therewith and each representation has an indicia associated therewith. A telephone-dial-like device is provided with the indicia of the representations associated therewith. The multi-digit numbers being chosen so that when one of the numbers associated with an identification or description is dialed, the indicia which is associated with the correct representation will be indicated upon the completion of the dialing of the number.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a top plan view of one embodiment of this invention;

FIG. 2 is a cross-sectional view of the embodiment shown in FIG. 1 taken substantially along line 2—2 of FIG. 1; and FIG. 3 is a perspective view of the gameboard of the embodiment shown in FIG. 1.

DESCRIPTION OF THE PREFERRED EMBODIMENT

Referring to the drawings, the improved game 10 of this invention comprises a gameboard 12 and a second board 14. Both the gameboard 12 and the board 14 may be composed of any suitable self-supporting material such as a sheet of cardboard, wood or the like. The gameboard 12 and board 14 are shown in a box 16 having a partition 18 therebetween. In a specific embodiment, both the gameboard 12 and the board 14 are removable from the box 16, if desired.

The gameboard 12 and the board 14 have upwardly facing surfaces 19 and 20, respectively. Pivotally mounted on the surface 20 of the board 14 is a spinner or indicating needle 22 which is shaped like an arrow at one end 23. Needle 22 is mounted between its ends on a pivot pin 24 which is secured at its lower end to the board 14. Encircling the needle 22 on the upper surface 20 of the board 14 and concentric with the pivot pin 24 is a circular arrangement of numbers indicated by the reference numeral 26. These numbers extend from 1 through 10.

Mounted adjacent to the needle 22 is a circular disc 28 which is mounted at its center on a pivot pin 30 about which it can rotate. The disc 28 is provided with a circumferential series of ten apertures 32 of a sufficiently large size to receive the tip of a player's finger. A U-shaped abutment member 34 has one leg 36 thereof secured to the board 14 and the other leg 38 thereof overlying the disc and extending diametrically of and inwardly of the disc whereby upon dialing the disc 28 a finger in an aperture 32 is prevented from moving past member 34.

Encircling the disc 28 on the surface 20 is a series of nine digits 1 through 9 which are arranged in a manner to circle and be concentric with the pivot pin 30 and spaced apart in a manner to correspond with the spacing between the apertures 32 so that when the disc 28 is positioned as shown, each of the apertures with the exception of one will have a number positioned therein and seen therethrough. A series of nine letters 37, A through I, are positioned on the disc 28 generally between adjacent pairs of apertures 32 in a manner to encircle and be concentric with the pivot pin 30.

An indicating member 39 is positioned adjacent to the periphery of disc 28 so as to indicate one of the letters 37 when a finger in one of the apertures 32 abuts member 34. This indicating member in a specific embodiment is a representation of a dog.

Disposed on the surface 18 of the gameboard 12 are nine different pictorial representations 40. In a specific embodiment, these representations are pictures of historical persons. Each pictorial representation has one of the letters 37 associated therewith. Also disposed on surface 19 of gameboard 12 is a list 42 of digits 26 and an associated list of identifications 44. Each of these identifications identify, describe, or otherwise refer to one of the pictorial representations 40. A third list of multi-digit numbers 46 also are arranged on surface 19 of the gameboard 12. There are nine identifications 44 and nine multi-digit numbers 46. Each identification has a multi-digit number 46 and a digit 26 associated therewith. As shown, lists 42, 44 and 46 may be arranged in side-by-side manner. The tenth digit 26 in the specific embodiment illustrated does not have a pictorial representation 40 or a multi-digit number 46 associated therewith. If this 10th digit is selected by the needle 22 as hereinbelow described, the player merely loses his turn.

Referring to FIG. 3, there is shown a second embodiment 12a of the gameboard 12. This gameboard is identical to the gameboard 12 except for the provision of an end flap 48 which is connected to the gameboard 12 by a hinge 50. In a specific embodiment, hinge 50 may be made of fabric material secured to both the gameboard 12a and the flap 48. Flap 48 is movable with respect to the gameboard 12 and has a size such that it can be laid over the portion of the gameboard 12 on which lists 42, 44 and 46 appear. This will result in lists 42, 44 and 46 being hidden from view. Flap 48 has a surface 52 opposite surface 19. On surface 52 of the flap 48 appears a second list 54 of digits 26, a second list of identifications or descriptions 56 and a second list of multi-digit numbers 58. Lists 54, 56 and 58 may be arranged identically with lists 42, 44 and 46. These lists relate to game involving the same pictorial representations 40 as the game played with lists 42, 44 and 46; however, the identifications or descriptions 44 and 56 of the respective games differ. In a specific embodiment, there may be more than one end flap 48.

In operation, the game is played by a player spinning the needle 22. The player determines the digit nearest the end 23 of the needle 22 when it stops. The same digit 26 is then found in list 42 or 54 and the player reads the identification or description 44 or 56 associated therewith. The player then guesses which pictorial representation 40 relates to the identification or description 44 or 56. Once this guess is made, the player positions the disc 28 such that the letter "A" appears closest to the indicating member 39 and dials the multi-digit number appearing in list 46 or 58 associated with the first-chosen digit 26. Upon the completion of the dialing of the multi-digit number, the player determines which letter 37 is closest to the indicating member 39. This letter 37 will refer the player to the representation 40 which correctly relates to the identification or description 44 or 56. If the player's guess was correct, the player receives one point.

In playing the game, as many players as desired take turns spinning the needle 22, guessing, dialing and determining whether or not the guess is correct. A score is kept. The player having the most score at the end of the game wins.

While there have been described above the principles of this invention in connection with specific apparatus, it is to be clearly understood that this description is made only by way of example and not as a limitation to the scope of the invention.

What is claimed is:

1. A game comprising first and second supporting members, said members each having a flat surface, a disc pivotally mounted on said first member adjacent and parallel to said surface thereof, said disc having a predetermined number of circumferentially spaced apart finger apertures therein, an abutment member secured to said surface of said first member and extending over said disc whereby a finger in an aperture will be prevented from moving in one direction by said abutment member, an indicating member secured to said surface of said first member adjacent to but spaced from the periphery of said disc, different first indicia arranged about the pivot of said disc on said surface of said first member, said first indicia being of the same number as said finger apertures, said first indicia being spaced apart and arranged in the same manner with respect to said pivot as said finger apertures of said disc, whereby said disc may be moved between a plurality of positions in which said finger apertures are in registry with said first indicia, different second indicia arranged on said disc, each of said second indicia being between an adjacent pair of said finger apertures, said second indicia being one less in number than said finger apertures and said first indicia, said indicating member being positioned to indicate one of said second indicia when a finger in one of said finger apertures of said disc abuts said abutment member, different representations and third indicia arranged on said surface of said second supporting member, each of said representations having associated therewith one of said third indicia, each of said third indicia being identical to one of said second indicia, there being the same number of representations and third indicia as second indicia, a second list of identifications of said representations, a third list of combinations, each of said combinations consisting of a plurality of said first indicia, each of said combinations being associated with one of said identifications, there being the same number of said identifications and combinations as second indicia, said combinations and said identifications being arranged on said second supporting member so that with said indicating member indicating a predetermined one of said second indicia the indicia of a selected one of said combinations may be dialed successively to said abutment member to point, upon completion of dialing said combination, said indicating member at one of said second indicia, said last-mentioned second indicia being identical to said second indicia associated with said representation correctly identified by said identification associated with said one combination, fourth indicia arranged on said first member, rotatable means mounted on said first member for selectively and randomly indicating one of said fourth indicia, and a list of 10 fourth indicia arranged on said second supporting member, each of said fourth indicia being associated with one of said identifications and one of said combinations.

2. The game of claim 1 wherein said indicating means is an elongated element pivotally mounted intermediate its ends on said first supporting member, said element being adjacent and parallel to said upper surface thereof, and wherein said fourth indicia are arranged in a circle about the pivot of said element, said pivot being the center of said circle.

3. The game of claim 1 wherein said second supporting member has two portions, said representations and said last-mentioned indicia being arranged on one of said portions, said portions having means for hingedly connecting said portions together.

4. The game of claim 3 wherein said other portion has two oppositely facing surfaces, said second list of identifications and said combinations associated therewith being arranged on a first surface of the group consisting of said surfaces of said one portion and one of said surfaces of said other portion, and wherein said combinations and a third list of different fourth indicia being arranged on the other of said surfaces of said other portion, each of said fourth indicia being associated with one of said combinations, said portions being swingable between a position in which said one portion overlays a portion of said other portion and said second list of identifications is hidden from view and said third list of fourth indicia can be viewed and a position in which said third list of fourth indicia is hidden from view and said second list of identifications can be viewed.

5. The game of claim 4 wherein said first indicia are numbers, said second indicia are letters, said representations are pictures of historical persons, said identifications are the names of said historical persons, and said fourth indicia are of the group consisting of terms of presidents of the United States and descriptions of historical persons.

* * * * *